(12) United States Patent
Weber et al.

(10) Patent No.: US 6,513,886 B1
(45) Date of Patent: Feb. 4, 2003

(54) BRAKE SYSTEM CONTROL IN WHICH UPDATE OF WHEEL SPEED NORMALIZATION FACTORS IS SELECTIVELY INHIBITED

(75) Inventors: John Andrew Weber, Farmington Hills, MI (US); Alfred Russell Robertson, Southfield, MI (US); Kevin Gerard Leppek, Rochester, MI (US); Alexander Kade, Grosse Pointe Woods, MI (US); Allen John Walenty, Macomb, MI (US); David Alan Thatcher, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 08/646,189

(22) Filed: May 7, 1996

(51) Int. Cl.$^7$ ................................................ B60T 8/58
(52) U.S. Cl. .................. 303/146; 303/177; 303/183; 303/184; 303/185
(58) Field of Search .................... 303/146, 147, 303/177, 181, 182, 183, 184, 185

(56) References Cited

U.S. PATENT DOCUMENTS

| | | | | |
|---|---|---|---|---|
| 4,180,223 A | * | 12/1979 | Amberg | 303/126 |
| 4,750,125 A | | 6/1988 | Leppek et al. | 364/426 |
| 4,835,695 A | | 5/1989 | Walenty et al. | 364/426.02 |
| 4,916,619 A | | 4/1990 | Walenty et al. | 364/426.02 |
| 4,917,445 A | | 4/1990 | Leppek et al. | 303/100 |
| 4,969,756 A | | 11/1990 | Villec et al. | 388/815 |
| 4,974,163 A | * | 11/1990 | Yasuno et al. | 303/182 |
| 5,003,481 A | * | 3/1991 | Matsuda | 303/174 |
| 5,163,743 A | | 11/1992 | Leppek et al. | 303/100 |
| 5,173,860 A | | 12/1992 | Walenty et al. | 364/426.02 |
| 5,206,808 A | * | 4/1993 | Inoue et al. | 303/146 |
| 5,234,262 A | | 8/1993 | Walenty et al. | 303/111 |
| 5,320,421 A | | 6/1994 | Kade et al. | 303/110 |
| 5,328,257 A | * | 7/1994 | Ohta et al. | 303/146 |
| 5,382,086 A | * | 1/1995 | Tuck et al. | 303/159 |
| 5,390,992 A | | 2/1995 | Walenty et al. | 303/112 |
| 5,474,368 A | * | 12/1995 | Sano | 303/182 |
| 5,522,652 A | * | 6/1996 | Negrin et al. | 303/183 |

FOREIGN PATENT DOCUMENTS

| | | |
|---|---|---|
| DE | 42 30 295 A1 | 3/1994 |
| EP | 0 170 478 | 5/1986 |

OTHER PUBLICATIONS

Brake adjuster Algorithm, Research Disclosure #32411, Published Apr. 1991.
Brake Fade Compensation Technique, Research Disclosure #31961, Published Nov. 1990 Vehicle Reference Over–Speed Normalization, Research Disclosure #31359, Published May 1990.
Surface Adaptive Torque Release, Research Disclosure #30762, Published Nov. 1989 Slip Command Brake Apply System, Research Disclosure #31955, Published Nov. 1990.
Method to Compensate for Velocity Dependent Compliance Variation in Drum Brakes, Research Disclosure #36801, Published Dec. 1994.
Adaptive Proportioning Fail–Safe, Research Disclosure No. 36621, Published Oct. 1994.
Adaptive Brake Proportioning, Research Disclosure #30755, Published Nov. 1989.

* cited by examiner

Primary Examiner—Matthew C. Graham

(57) ABSTRACT

A brake system control method for use in a vehicle in which wheel speed normalization factors are iteratively updated, comprising the steps of: monitoring a plurality of wheel speed signals from a plurality of wheel speed sensors; determining for each wheel a wheel acceleration responsive to the wheel speed signal; determining an acceleration dead band for each wheel, wherein the acceleration dead band is proportional to a measure of vehicle acceleration; comparing the wheel acceleration to the dead band; and if the magnitude of the wheel acceleration is greater than the magnitude of the dead band, inhibiting update of the normalization factors.

10 Claims, 4 Drawing Sheets

BRAKE SYSTEM CONTROL IN WHICH UPDATE OF WHEEL SPEED NORMALIZATION FACTORS IS SELECTIVELY INHIBITED

This invention relates to a brake system control method and apparatus.

BACKGROUND OF THE INVENTION

Many automobiles include anti-lock brake systems as standard or optional features. Some automobiles include traction control systems for preventing wheel slip during positive acceleration of the vehicle. Anti-lock brake systems and many traction control systems utilize wheel speed sensors that provide individual wheel speed information to the brake controller allowing the controller to perform its anti-lock and/or traction control functions. Vehicles have also been provided with a telltale in the instrumentation panel that illuminates when the anti-lock brake system and/or traction control system is activated to indicate to the driver that the vehicle may be on a road surface with low traction or a low coefficient of friction.

In operation, typical anti-lock brake systems monitor the wheel speeds of the vehicle wheels and determine a normalization factor for each wheel. This normalization factor is designed to offset differences in wheel rolling radii due to uneven weight distribution of the vehicle on the wheels, uneven tire fill pressures, etc. Typically, the normalization factors are continuously updated, except when the vehicle is in anti-lock brake control mode or traction control mode.

SUMMARY OF THE PRESENT INVENTION

It is an object of this invention to provide a brake control system according to claim 1.

Advantageously, this invention provides a brake system control for scrutinizing wheel speed signals from wheel speed sensors and determining normalized wheel speed signals with increased accuracy. Advantageously, this invention uses the measured wheel speed signals to determine normalization factors for the vehicle wheels and uses the normalization factors to determine the normalized wheel speeds. Advantageously, this invention inhibits updating the normalization factors in a variety of wheel conditions that would provide contaminated wheel speed information, otherwise impairing the accuracy of the normalization factors and, thus, the normalized wheel speed signals.

Advantageously, the criteria used to determine whether the normalization factors are to be updated are stricter than previously known and the result is that the normalized wheel speeds determined according to this invention have improved accuracy.

Advantageously, this invention provides a brake system control that monitors the vehicle wheel speed information as provided by the vehicle wheel speed sensors and analyzes that information against a variety of criteria to determine whether normalization factors should be updated. If any of the tests indicate that the wheel speed information is not sufficiently free from contamination due to road conditions, the wheel normalization factors are not updated. Additionally, in a preferred example, each time that the system detects that the wheel speed information may be contaminated due to road conditions, a timer is updated and, when the timer reaches a predetermined threshold, a telltale, chime, or other signal for the driver is activated.

BRIEF DESCRIPTION OF THE DRAWINGS

The present invention will now be described by way of example with reference to the following drawings in which.

DETAILED DESCRIPTION OF THE INVENTION

Figure 1:
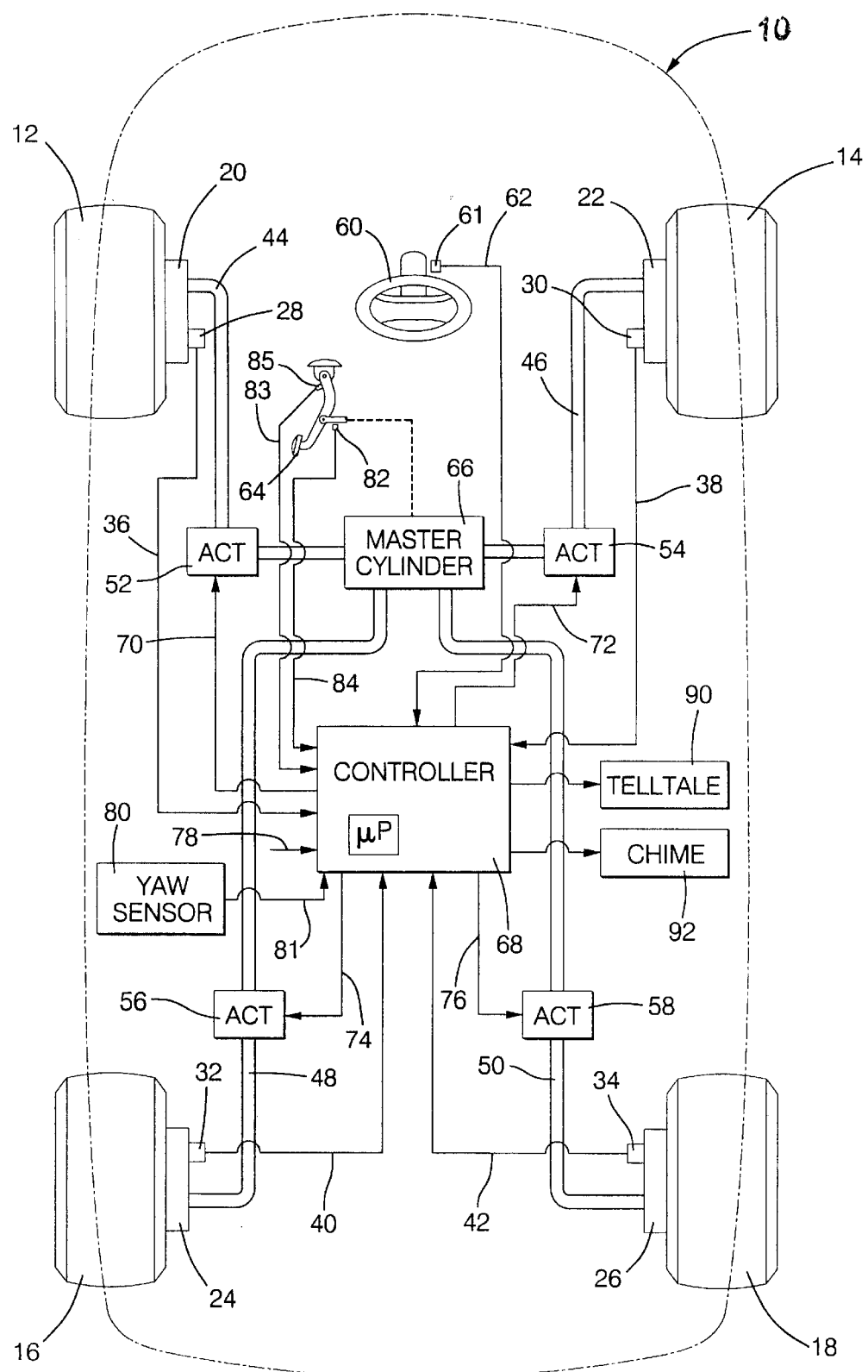
FIG. 1 illustrates a schematic of an example apparatus for implementing this invention.

Referring to FIG. 1, the vehicle 10 shown includes a controllable brake system with controller 68 for controlling the brakes 20, 22, 24 and 26 for wheels 12, 14, 16 and 18, respectively. Various inputs to the controller 68 include the wheel speed signals on lines 36, 38, 40 and 42 from wheel speed sensors 28, 30, 32 and 34, the brake pedal switch signal on line 84 from brake pedal switch 82, the brake pedal travel signal on line 83 from pedal travel sensor 85, the steering wheel angle signal on line 62 from sensor 61 indicating the angle of steering wheel 60, the vehicle velocity signal on line 78 and the yaw rate signal on line 81 from yaw rate sensor 80.

Each of the sensors 28, 30, 32, 34, 61, 80, 82 and 85 is implemented in a manner known to those skilled in the art. The brake pedal travel sensor 85 is a rotary resistive sensor mounted at the pivot point of pedal 64 providing a resistive output that changes with the amount of arcuate travel of pedal 64. Alternative sensors for sensor 85 include a pedal travel sensor mounted to the linkage of pedal 64, a pedal force sensor or a master cylinder pressure sensor. In some implementations, combinations of sensors may be used.

Responsive to the various inputs, the controller controls the braking of each wheel in anti-lock brake mode, and, if the vehicle implements active brake control and/or brake by wire braking, the brakes are also controlled in these additional modes. Further, if a traction control system utilizing the friction brakes is implemented, the brake controller controls activation of the brakes during positive vehicle acceleration traction control events to maintain positive tractive force of the drive wheels on the road surface.

Brake control is generally achieved as follows. Brake controller 68 receives the various input signals from the various sensors and, responsive to those signals, determines a control commands for the various brake actuators 52, 54, 56 and 58. Responsive to the various brake commands, the actuators 52, 54, 56 and 58 control the hydraulic pressure in hydraulic lines 44, 46, 48 and 50, controlling the friction brakes 20, 22, 24 and 26.

Because example brake by wire, active brake control, traction control and anti-lock brake control systems are known to those skilled in the art and are not germane to this invention, detailed description thereof will not be set forth herein.

In one example, the brake actuators 52–58 are implemented as reciprocating piston actuators of a type known to those skilled in the art. Such actuators typically include a dc motor positionally controlling a reciprocating piston through a rotary to linear motion converter to increase and/or decrease hydraulic pressure in the wheel brakes. The rear brake actuators 56 and 58 can be implemented in a known manner in which a single motor simultaneously drives two pistons controlling brake fluid to brakes 24 and 26.

In another example, brake actuators 52–58 are implemented as solenoid valves for selectively coupling brakes 20–26 to a source of pressurized hydraulic fluid to increase brake pressure and for selectively coupling brakes 20–26 to a brake fluid reservoir to decrease brake pressure. Implementation of such solenoid valve systems is known to those skilled in the art.

In yet another example, the rear brakes and/or the front brakes may be electric motor-driven brakes, in which case the actuator and brake functions are performed by the same unit. An example of a brake system including front hydraulic brakes and rear electric brakes in which all four brakes are drive by wire is set forth in U.S. Pat. No. 5,366,291, assigned to the assignee of this invention.

According to the preferred example of this invention, the brake controller 68 performs the anti-lock brake functions and other brake functions that may be implemented in the vehicle. The brake controller 68 also monitors the wheel speed signals and, whether or not the wheel speed signals justify activating the anti-lock brake functions or other brake functions that may be included in the vehicle, provides a signal to the vehicle driver either through telltale 90 or chime 92 or both indicating to the vehicle driver that the vehicle may be on a low coefficient of friction road surface or that one or more wheels may be experiencing low traction.

Figure 2:
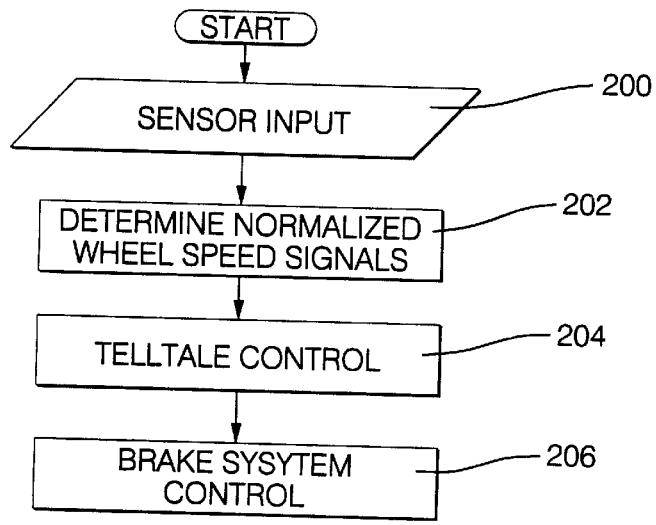
FIG. 2 illustrates a general flow routine for the vehicle brake controller.

Referring now to FIG. 2, the control routine for controller 68 receives the various inputs from the various sensors at block 200. At block 202, the routine determines and then updates wheel normalization factors and uses the normalization factors to determine the normalized wheel speeds. At block 204, the routine controls a telltale, chime or other signal system in the manner described below in response to the road conditions as determine at block 202. Blocks 202 and 204 are described in detail below with reference to FIGS. 3a–c.

Next at block 206, the controller controls the vehicle brake systems, i.e., the anti-lock brake system and traction control system, in a manner known to those skilled in the art utilizing the normalized wheel speed signals.

Figure 3A:
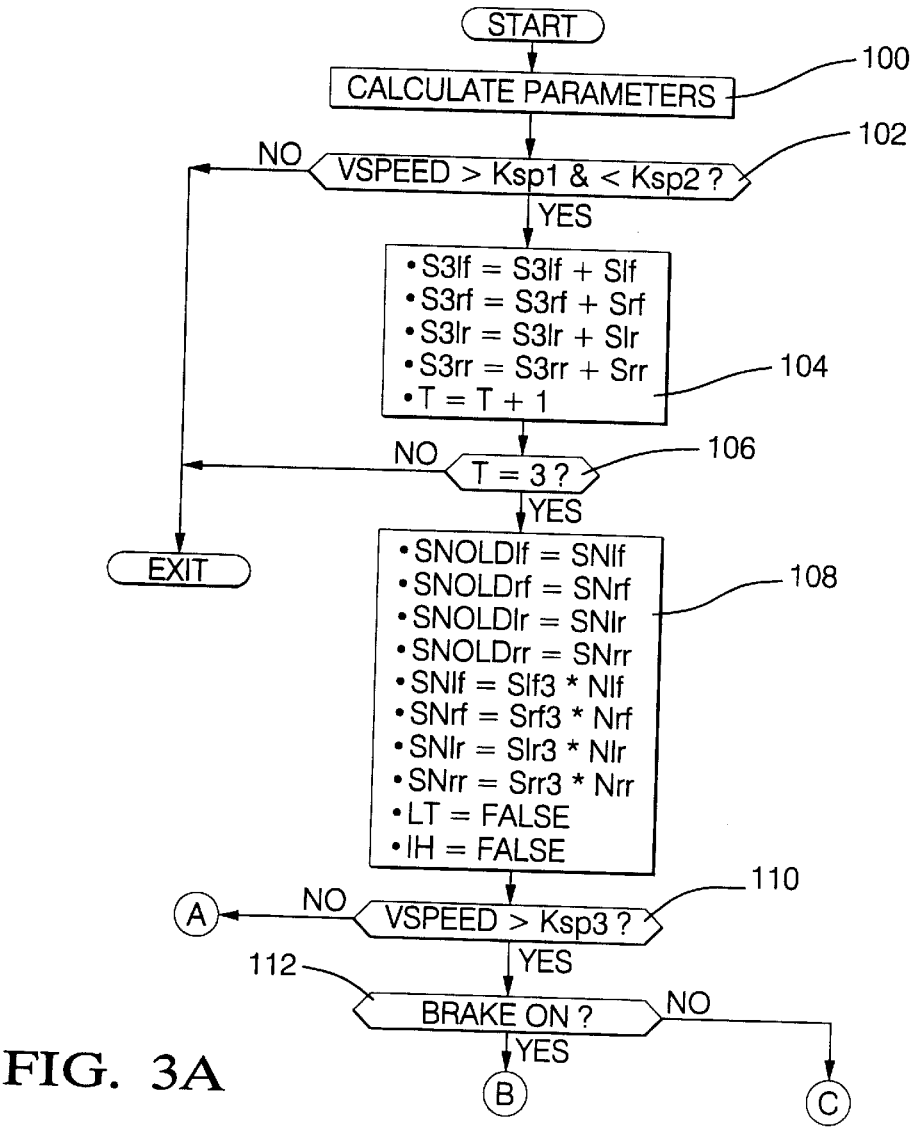
FIGS. 3a–c illustrate a flow diagram of an example computer routine for implementing this invention in the apparatus shown in FIG. 1.
Figure 3B:
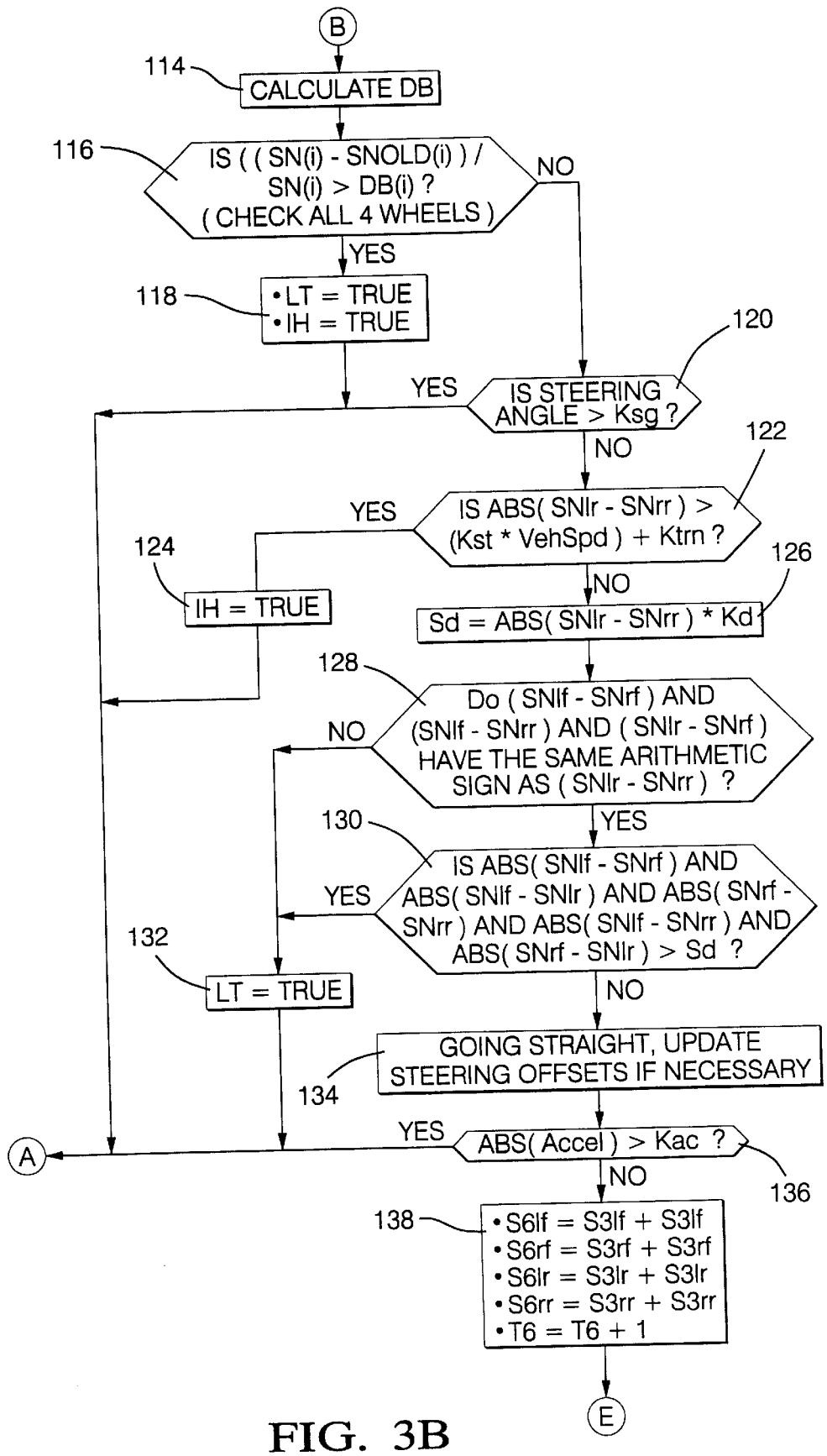
Figure 3C:
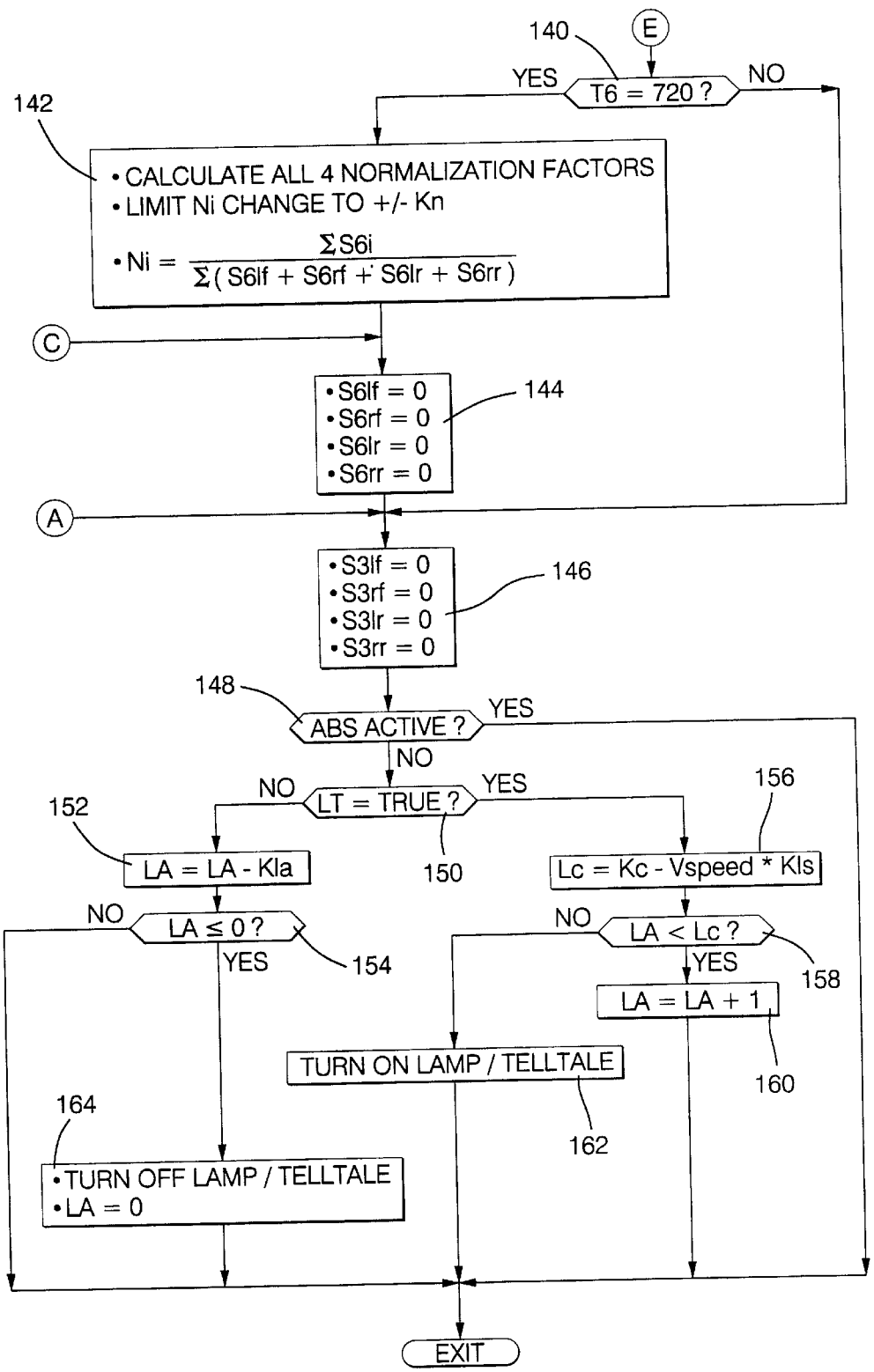

Referring now to FIGS. 3a–c, the routine for determining the vehicle condition according to this invention starts at block 99 where it receives the various inputs from the various sensors and then moves to block 100 where it calculates the vehicle velocity, the vehicle acceleration and the vehicle steering angle. The vehicle velocity may be determined as the average of the speeds of the undriven wheels or, if all four wheels of the vehicle are driven, as the average of the speeds of all of the wheels. The vehicle acceleration is determined as the derivative of the vehicle velocity.

The routine then moves to block 102 where it compares the vehicle velocity $v_{speed}$ to two velocity thresholds corresponding to, for example, 12 and 80 m.p.h. If the vehicle velocity is not between the two thresholds, the routine is exited. If at block 102 the vehicle velocity is between the two thresholds, the routine continues to block 104 where it keeps a running sum for three control loops of each wheel velocity signal as follows:

$$S3_{LF}=S3_{LF}+S_{LF},$$

$$S3_{RF}=S3_{RF}+S_{RF},$$

$$S3_{LR}=S3_{LR}+S_{LR},$$

and $$S3_{RR}=S3_{RR}+S_{RR},$$

where $S_{LF}$, $S_{RF}$, $S_{LR}$ and $S_{RR}$ are the left front, right front, left rear and right rear filtered wheel velocity signals (the wheel velocity signals are filtered by a low pass filter of a known type to attenuate sensor noise, etc.) and $S3_{LF}$, $S3_{RF}$, $S3_{LR}$ and $S3_{RR}$ are the left front, right front, left rear and right rear wheel velocity signal sums. At block 104, the routine also increments the timer T.

At block 106, the timer T is compared to 3 and, if T is not equal to 3, the routine is exited. Once T is equal to 3, then the sums $S3_{LF}$, $S3_{RF}$, $S3_{RR}$ and $S3_{RR}$ are completely determined and the routine continues to block 108 where it updates the normalized wheel speed variables. The variable designating the most recent previous normalized wheel speeds are updated as follows:

$$SNold_{LF}=SN_{LF},$$

$$SNold_{RF}=SN_{RF},$$

$$SNold_{LR}=SN_{LR},$$

and $$SNold_{RR}=SN_{RR},$$

where $SNold_{LF}$, $SNold_{RF}$, $SNold_{LR}$ and $SNold_{RR}$ are the most recent previous normalized wheel speeds and $SN_{LF}$, $SN_{RF}$, $SN_{LR}$ and $SN_{RR}$ are the present values of the normalized wheel speeds. Block 108 also then updates the present values of the normalized wheel speeds as follows:

$$SN_{LF}=S3_{LF}*N_{LF},$$

$$SN_{RF}=S3_{RF}*N_{RF},$$

$$SN_{LR}=S3_{LR}*N_{LR},$$

and $$SN_{RR}=S3_{RR}*N_{RR},$$

where $N_{LF}$, $N_{RF}$, $N_{LR}$ and $N_{RR}$ are the left front, right front, left rear and right rear normalization factors for the wheel speed signals. Also at block 108, the flag LT is set to false and the flag IH is set to false. The flag LT controls, in the manner described further below, when the telltale is illuminated and the flag IH, when set, inhibits other control features that depend upon wheel speed signals, i.e., in a brake-by-wire system with dynamic front to rear brake proportioning, the IH flag may inhibit the dynamic front to rear brake proportioning.

From block 108, the routine moves to block 110 where it compares the vehicle speed to the threshold Ksp3 which is set at, for example, 25 m.p.h.. If the vehicle speed is not greater than the threshold Ksp3, the minimum speed at which the telltale will be lit, the routine moves to block 146 described below. The test at block 110 bypasses the normalization factor update (described below) if the vehicle speed is not great enough.

If the vehicle speed is greater than the threshold Ksp3, the routine continues to block 112 where it determines, by monitoring the output of the brake pedal switch, whether or not the brake pedal has been depressed. If the brake pedal is depressed at block 112, the routine continues to block 144 described below. The test at block 112 bypasses the normalization factor update and resets the wheel speed sums $S6_{LF}$, $S6_{RF}$, $S6_{LR}$, $S6_{RR}$, used in the normalization factor determination, each time the brake pedal is depressed. If the brake pedal is not depressed at block 112, the routine continues to block 114 where it determines a dead band value, DB, as follows:

$$DB=|ACCEL|*Kjtracc+V_{speed}*Kjtrspd+Ktrdiff,$$

where ACCEL is the vehicle acceleration, Kjtracc is the acceleration gain term, Kjtrspd is the speed gain term and Ktrdiff is an offset value. The above dead band determination provides an advantage that the dead band is proportional to both vehicle acceleration and vehicle speed. Making the dead band proportional to vehicle speed eliminates unnecessary cycling of the telltale during high speed conditions and making the dead band proportional to vehicle acceleration eliminates unnecessary cycling of the tell tale during high acceleration conditions. The constants Kjtracc, Kjtrspd and Ktrdiff are calibratable as a system designer desires.

After the dead bands are computed at block 114, the routine continues to block 116 where the dead band tests are performed on each wheel. Using the left front wheel as an example, the quantity determined by $(SN_{LF}-SNold_{LF})/SN_{LF}$ is compared to the dead band DB. If the quantity is greater than the dead band for any of the vehicle wheels, the routine moves to block 118 where it sets the flags LT and IH to true and then continues to block 146 described below. If at block 116 the determined quantity for each wheel is not greater than the dead band, then the routine continues to block 120 where it compares the steering angle to a predetermined constant Ksg.

The steering angle may either be determined from a steering wheel angular position sensor such as represented by reference 61 in FIG. 1 or from the normalized wheel speed signals from either the front or rear vehicle wheels. For example, using the front wheels, the steering angle can be determined as follows:

$$\text{STEER ANGLE}=(SN_{LF}-SN_{RF})*K_{FRT}$$

where $K_{FRT}$ is a constant taking into account the track width of the vehicle. Using the rear wheel speeds, the steering angle can be determined as:

$$\text{STEER ANGLE}=(SN_{LR}-SN_{RR})*K_{RR}$$

where $K_{RR}$ is a constant taking into account the wheel base and track width of the vehicle. Any of the above ways for determining the steering angle is acceptable.

The comparison at block 120 determines whether or not the vehicle is turning at too great of a rate to calculate updated normalization factors for the wheel speed signals. The constant KSG may be scheduled based on vehicle speed to decrease as vehicle speed increases. The test at block 120, if passed, moves the routine to block 146 described below, bypassing those parts of the routine, block 142 and 144, that update the normalization factors. This is advantageous because, if the vehicle is turning at too great of a rate, roll of the vehicle body affects the weight distribution between the right and left vehicle tires and the tire rolling radii, thus contaminating the wheel speed information in a manner undesirable for calculating the normalization factors.

If at block 120 the test is not passed, the routine continues to block 122. At block 122 the absolute value of the difference between $SN_{LR}$ and $SN_{RR}$ is compared to the quantity $(Kst*V_{speed}+Kstacc*ACCEL+Ktrn)$, where Kst is a speed gain, Kstacc is a vehicle acceleration gain and Ktrn is an offset. The speed and acceleration gain terms increase the quantity with either vehicle speed, acceleration, or both. This comparison of the rear wheel speeds to the quantity determined at block 122 is a threshold test for determining if the vehicle is going straight. If $SN_{LR}-SN_{RR}$ is greater than the quantity, this indicates that the vehicle is turning and the routine continues to block 124 where it sets the flag IH equal to true (but does not set the LT flag) and then to block 146 described below, bypassing the normalization factor update.

This prevents the wheel normalization factors from being updated if vehicle is turning, in which case body roll of the vehicle is assumed to corrupt the un-normalized wheel speed signals.

If the test is not passed at block 122, the routine moves to block 126 where it determines a value Sd equal to the absolute value of $((SN_{LR}-SN_{RR})*Kd)$, where Kd is a calibratable gain term. Sd is used below to determine if any relative slip between any two wheels indicates that the normalization should be bypassed and the LT flag set to true.

At block 128 the routine determines whether the following quantities all have the same sign: $SN_{LF}-SN_{RF}$, $SN_{LF}-SN_{RR}$, $SN_{LR}-SN_{RF}$, and $SN_{LR}-SN_{RR}$. These quantities are the left-to-right front and rear and diagonal cross car slips. If all of the quantities at block 128 do not have the same sign, the routine continues to block 132 where it sets the flag LT equal to true and then continues to block 146, bypassing the normalization factor update.

If the differences at block 128 all have the same sign, the routine continues to block 130 where it compares the absolute value of each of the following differences to Sd: $SN_{LF}-SN_{RF}$; $SN_{LF}-SN_{LR}$; $SN_{RF}-SN_{RR}$; $SN_{LF}-SN_{RR}$ and $SN_{RF}-SN_{LR}$. If any of the differences determined at block 130 are greater than Sd, this indicates a road condition in which it is not desirable to update the normalization factors and the routine continues to block 132 where it sets the LT flag to true and then continues to block 146, bypassing the update to the normalization factor routine. If all of the differences at block 130 are not true, then the routine continues to block 134 where it assumes that the vehicle is going in a straight direction and updates the steering wheel position sensor offset if necessary so that the steering wheel output indicates the straight ahead position.

From block 134 the routine continues to block 136 where it compares the absolute value of the vehicle acceleration to a constant Kac. If at block 136 the absolute value of the vehicle acceleration is greater than Kac, this indicates that the vehicle is accelerating or decelerating too much to update the normalization factors and, thus, the routine continues to block 146, bypassing the normalization update. If the test at block 136 indicates that the vehicle acceleration absolute value is not greater than Kac, the routine continues to block 138.

Block 138 begins the update of the normalization factors by keeping track of a sum S6 for each wheel representing the sum for approximately 6 seconds, or 720 control loops (assuming 120 control loops per second), of the unnormalized wheel speeds as follows:

$$S6_{LF}=S6_{LF}+S3_{LF},$$

$$S6_{RF}=S6_{RF}+S3_{RF},$$

$$S6_{LR}=S6_{LR}+S3_{LR},$$

and $$S6_{RR}=S6_{RR}+S3_{RR}.$$

Block 136 also increments the timer T6. At block 140 the timer T6 is compared to the value 720, the selected time out value in this example. If T6 is not equal to 720, the normalization factors are not yet updated and the routine continues to block 146.

When, at block 140, the timer T6 equals 720, the routine continues to block 142 where it calculates normalization factor for each wheel as follows:

$$N_i=S6_i/(S6_{LF}+S6_{RF}+S6_{LR}+S6_{RR}),$$

where i=LF, RF, LR, RR. In the event that the change in $N_i$ from the previous $N_i$ is greater than +/−Kn, the new $N_i$ is limited so that it is no more than +/−Kn different from the previous $N_i$, where Kn is a predetermined constant. The normalization factor update is repeated for each wheel.

From block 142, the routine continues to block 144 where it resets all of the variables $S6_i$ to zero and resets the timer T6 to zero. From block 144 the routine continues to block 146 where it resets the values $S3_i$ all to zero and resets the timer T=0. From block 146 the routine continues to block 148 where it checks the flag in memory indicating whether or not the anti-lock brake system is active. This flag is determined and set in a conventional manner known to those skilled in the art that need not be set forth in detail herein. If ABS is active, the routine is exited as the ABS system typically already includes a feature for illuminating an ABS telltale on the vehicle instrument panel. If ABS is not active at block 148, the routine continues to block 150 where it checks whether or not the flag LT is set to true. If, at block 150, the LT flag is true, the routine continues to block 156.

At block 156 the routine determines a threshold value $Lc=Kc−V_{speed}*Kls$, where Kc represents the default time for the telltale timer and Kls is a gain multiplied by the vehicle speed to reduce, as vehicle speed increases, the time period Lc, that the LT flag must be set before the telltale is illuminated. Thus, the threshold time Lc is variable, inversely proportional to vehicle speed. At block 158 the routine compares the variable LA to Lc. If LA is less than Lc, the routine continues to block 160 where LA is incremented. Blocks 156 and 158 institute a delay in turning on the telltale after the LT flag is set to true. The delay is largest at low vehicle speeds and reduces to virtually zero delay in high vehicle speeds. From block 160, the subroutine is exited.

If, at block 158, LA is not less than Lc, the routine continues to block 162 where it sends an output signal turning on the telltale or other signal, such as an audible chime for the vehicle driver. If at block 150 the flag LT is not set to true, the routine continues to block 152 where the variable LA is reduced by the value Kla. Then, at block 154, if LA is less than or equal to zero, the routine continues to block 164 where it outputs a command turning off the telltale lamp, chime or other signal to the vehicle driver and sets the value LA equal to zero.

If, at block 154, LA is not less than or equal to zero, then the routine is exited. In this manner, blocks 152 and 154 institute a delay so that after the LT flag is reset from true to false, the telltale chime or other signal is turned off after a time delay.

Further modifications to the above routine may be included. For example, after step 120, a step may be added to modify the dead band signals, separating out the left and right dead bands based on which way the vehicle is turned by the steering wheel to take into account distribution of vehicle weight that occurs during slow turns that do not pass the test at block 120, but still have some affect on the right to left weight distribution of the vehicle wheels. Another test can be added during braking to indicate pre-ABS entry conditions, for example, if the sum of the front wheel accelerations as determined from the front wheel speed signals minus the sum of the rear wheel accelerations is greater than a predetermined constant, which may be modified based on steer angle of the vehicle and vehicle speed, for more than a predetermined time period, then the LT flag is set to true. This condition would occur, for example, if the vehicle is braking and moves from a high to low coefficient surface.

Additionally, a test can be added to indicate less than optimal wheel to road engagement due to cornering of the vehicle as follows: YAW RATE FRT−YAW RATE RR is compared to a predetermined constant. If the difference in yaw rates is greater than the predetermined constant for more than a predetermined time period, then the LT flag is set to true. The front and rear yaw rates are determined as follows:

$$YAW\ RATE\ FRT=STEER\ ANGLE\ FRT*v_{speed}$$

$$YAW\ RATE\ RR=STEER\ ANGLE\ RR*v_{speed},$$

where STEER ANGLE FRT and STEER ANGLE RR are computed as described above with reference to block 120.

Additionally, deviation of the actual vehicle yaw rate from the commanded vehicle yaw rate can be computed if the vehicle has a steering wheel position sensor that provides an output signal of actual steering angle, in which case, a commanded yaw rate can be determined as:

$$YAW\ RATE\ COMMAND=ACTUAL\ STEER\ ANGLE*v_{speed}.$$

This commanded yaw rate can be compared to the yaw rate of the vehicle as measured by the rear wheel signals, wherein if the commanded yaw rate minus that computed using the rear wheel speeds is greater than a $Kyaw/v_{speed}$, where Kyaw is a predetermined constant, for more than a predetermined time period, the LT flag is set to true.

Additionally, if the vehicle is provided with a pedal position sensor 85, illustrated in FIG. 1, the commanded vehicle deceleration determined by the pedal position sensor and the actual vehicle deceleration can be compared. The commanded deceleration is determined as DECEL=pedal position*Kpdl, where Kpdl is a constant, and the difference between the DECEL and actual vehicle deceleration is compared to a predetermined threshold. If the difference is greater than the predetermined threshold for a predetermined time period, the LT flag is set to true.

Alternatively, a SLIP command can be determined as a product of the pedal position and a constant Kpslip and the SLIP command minus actual wheel slip is compared to another predetermined threshold, Kslip. If the difference is greater than the predetermined threshold for a predetermined time period, the LT flag is set to true.

What is claimed is:

1. A brake system control method for use in a vehicle in which wheel speed normalization factors are iteratively updated, comprising the steps of:

monitoring a plurality of wheel speed signals from a plurality of wheel speed sensors;

determining for each wheel a wheel acceleration responsive to the wheel speed signal;

determining an acceleration dead band for each wheel, wherein the acceleration dead band is proportional to a measure of vehicle acceleration;

comparing the wheel acceleration to the dead band; and if the magnitude of the wheel acceleration is greater than the magnitude of the dead band, inhibiting update of the normalization factors.

2. A brake system control method according to claim 1, wherein the acceleration dead band is also proportional to vehicle speed.

3. A brake system control method according to claim 1, wherein the acceleration dead band is determined according to:

$$Dead\ Band=K1*ACCEL+K2*SPEED+K3,$$

where K1, K2 and K3 are predetermined constants and wherein ACCEL is the vehicle acceleration and SPEED is the vehicle speed.

4. A brake system control method according to claim 1, also comprising the steps of:
- measuring front and rear cross body wheel slips and first and second diagonal cross body wheel slips;
- determining if any of the front, rear, first diagonal and second diagonal cross body wheel slips have differing signs; and
- inhibiting update of the normalization factors if any of the front, rear, first diagonal and second diagonal cross body wheel slips have differing signs.

5. A brake system control method according to claim 1, also comprising the steps of:
- determining a steer angle of the vehicle;
- comparing the steer angle to a threshold;
- inhibiting update of the normalization factors if the steer angle is greater than the threshold.

6. A brake system control method according to claim 1, also comprising the steps of:
- incrementing a counter each time the wheel acceleration is greater than the dead band; and
- providing a signal to the vehicle driver if the counter reaches a threshold.

7. A brake system control method according to claim 6, wherein the threshold value is inversely proportional to vehicle speed.

8. A brake control system method according to claim 1, also comprising the steps of:
- measuring front and rear cross body wheel slips and first and second diagonal cross body wheel slips;
- comparing each of the wheel slips to a threshold; and
- inhibiting update of the normalization factors if any of the wheel slips exceed the threshold.

9. In a vehicle in which wheel speeds are measured and normalized wheel speeds are determined and iteratively updated, a brake system control method comprising the steps of:
- subjecting the normalized wheel speeds to a criteria;
- if the normalized wheel speeds meet the criteria, enabling the update of the normalized wheel speeds and clearing a timer;
- if the normalized wheel speeds do not meet the criteria, inhibiting the update of the normalized wheel speeds and incrementing the timer;
- signaling the vehicle driver if the timer passes a threshold value.

10. A brake system control method according to claim 9, wherein the threshold value is inversely proportional to vehicle speed.

* * * * *